Oct. 27, 1936.  T. R. HARRISON  2,058,585
AUTOMATIC CONTROL SYSTEM
Original Filed March 25, 1924    3 Sheets-Sheet 1
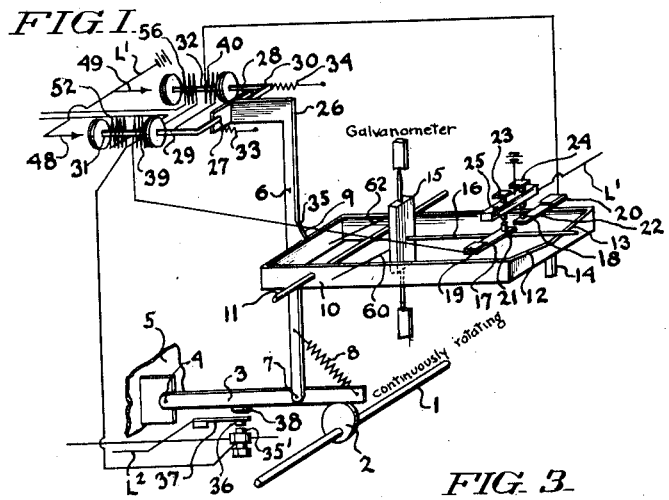
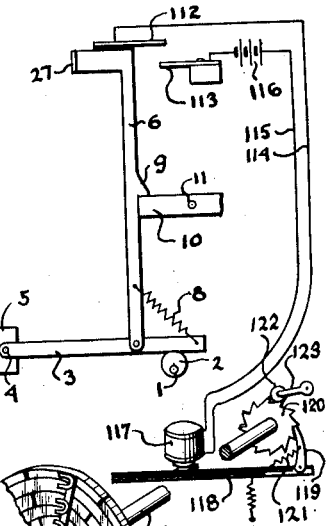
INVENTOR.
*Thomas R. Harrison,*
BY *John E. Hubbell*
ATTORNEY

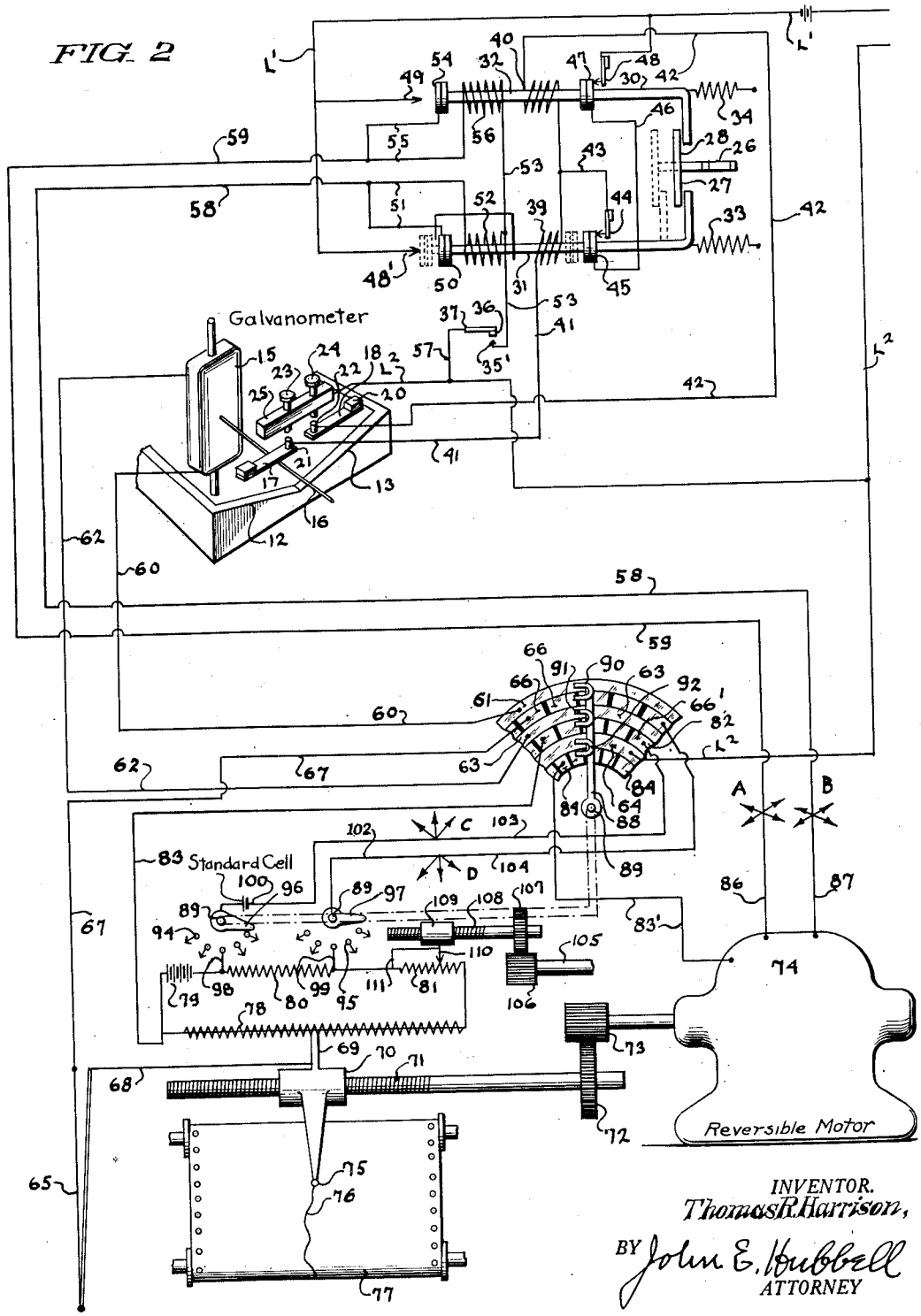

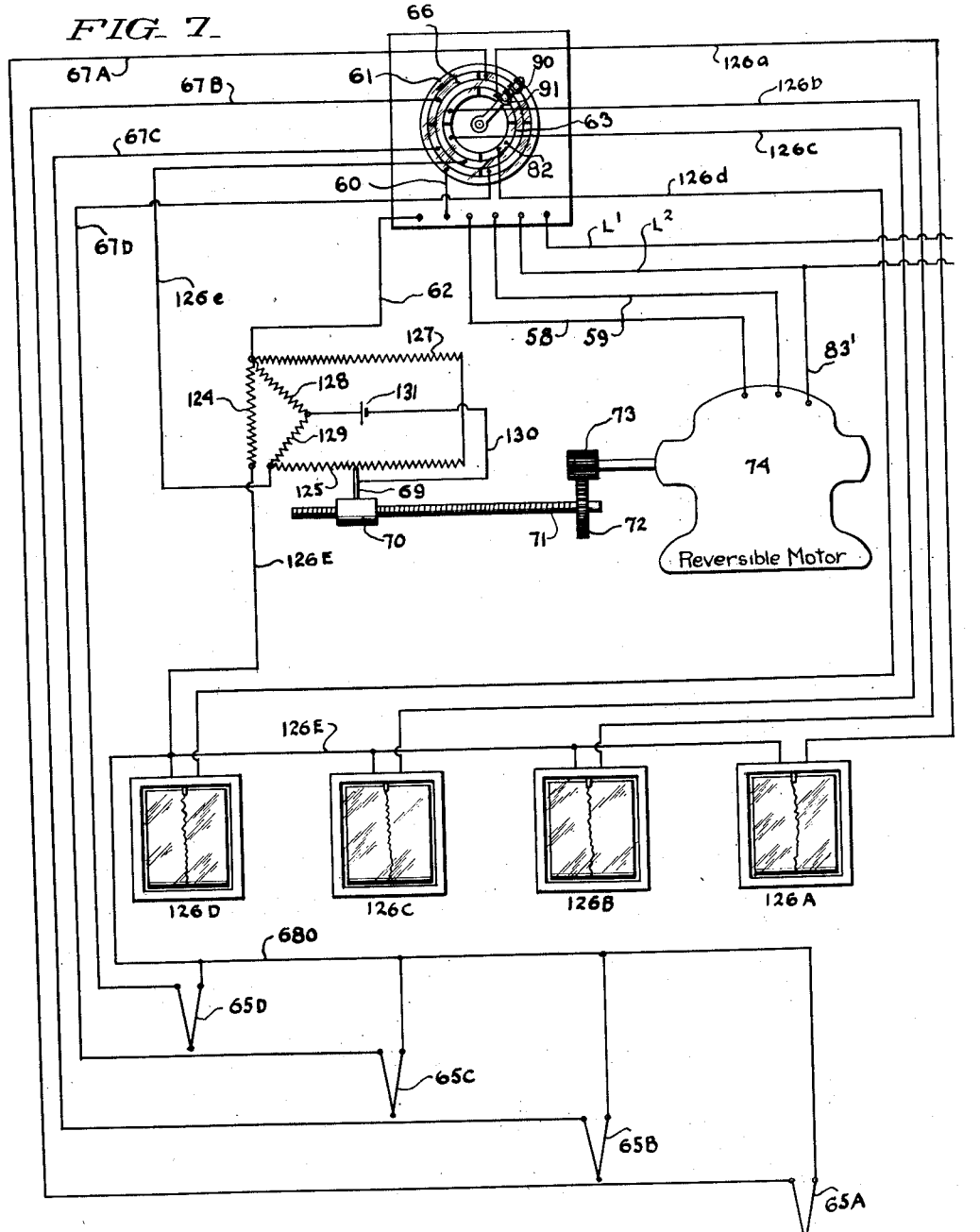

Patented Oct. 27, 1936

2,058,585

UNITED STATES PATENT OFFICE 2,058,585

AUTOMATIC CONTROL SYSTEM

Thomas R. Harrison, Philadelphia, Pa., assignor to The Brown Instrument Company, Philadelphia, Pa., a corporation of Pennsylvania Original application March 25, 1924, Serial No. 701,829. Patent No. 1,898,182, dated January 19, 1933. Divided and this application May 21, 1932, Serial No. 612,735

17 Claims. (Cl. 177—351)

The present invention is a division of my application filed March 25, 1924, for Patent 1,898,182 granted January 19, 1933 and discloses various improvements in automatic control systems and apparatus particularly devised for use in controlling recorders, switches, motors, valves, rheostats and like devices or instrumentalities to be controlled in response to mechanical, chemical, electrical or other physical changes of condition in order to effect a record of the changes, or to maintain predetermined physical conditions at controlled points, which are not claimed herein, but are claimed in said prior application.

The invention claimed herein comprises the combination of a single galvanometer, or analogous controlling element, with a plurality of devices or instrumentalities to be controlled in which each of said instrumentalities is controlled by said galvanometer and thereby caused to respond to variations in a particular one of a corresponding plurality of measurable conditions with which the galvanometer or analogous element is successively associated, there being in general an instrumentality to be controlled for, and individual to, each of said measurable conditions.

The use of the above mentioned combination claimed herein, not only permits of a suitable control of a plurality of instrumentalities by a single galvanometer or element and thereby reducing the bulk and cost of the control system, but also permits the galvanometer or analogous control element, which ordinarily is relatively sensitive and delicate, to be located in some isolated position, where it will be free from vibration, dust, deteriorating gases and the like, and where it may be conveniently kept in proper operating condition, while permitting the more rugged controlled instrumentalities to be placed in position more convenient from the standpoints of accessibility and the performance of their functions. For example, in a system for recording and controlling conditions in a plurality of furnaces, the controlled instrumentalities may comprise a recording potentiometer for, and located in proximity to, each furnace, while the galvanometer controlling all of the controlled potentiometers may be located in a suitable central or control room.

The objects of the present invention are to provide simplified and more efficient, more accurate, and more rugged and reliable methods and apparatus for controls and recorders of the character described, and such other objects as may be attained by the utilization of apparatus and principles hereinafter set forth in the many relations to which the combinations and subcombinations herein claimed, and their equivalents, may be adapted by those skilled in the art.

Referring to the drawings:

Fig. 1 is a more or less diagrammatic disclosure of the essential elements of the galvanometer arrangement and mechanical control, together with one form of switch circuit.

Fig. 2 is a distorted diagrammatic disclosure of the arrangement in Fig. 1 as applied to one form recorder arrangement.

Fig. 3 shows a modified switching arrangement.

Fig. 4 shows the balancing rheostat and variable current recorder arrangement.

Fig. 5 shows a mechanical switch lock and release arrangement.

Fig. 6 shows a modification of the switching arrangement shown in Fig. 3.

Fig. 7 is a diagrammatic disclosure of a system in which the balancing rheostat of Fig. 4 is associated with a plurality of thermocouples and current meters.

In Fig. 1, I represents a shaft rotated at a uniform rate of speed by any suitable means, not shown, and has secured thereto an eccentric cam 2 which by its rotation rocks an arm 3 vertically about pivot 4 secured to a suitable fixed support 5. A vertical member 6 is pivoted to arm 3 at 7 and is urged to the right in Fig. 1 by a tension spring 8. A projecting lug 9 is provided and forms a shoulder adapted to hook over and engage a frame 10 which in turn is pivotally mounted on a spindle 11. The front edge of frame 10 is provided with inclined upper edges or surfaces 12 and 13 in a manner to form a shallow V-shaped depression therein. A suitable fixed stop 14 is provided to limit the downward movement of frame 10. A galvanometer 15 pivoted for horizontal movement, is so arranged that the needle 16 thereof swings directly over the surfaces 12 and 13 when the galvanometer is deflected and when the galvanometer is in normal position, the needle will be directly over the point of the V in the center of the frame. A pair of contact springs 17 and 18 suitably supported from fixed blocks 19 and 20 are arranged above frame 10 in a manner not to interfere with the pivotal movement of the frame, and so that as the frame is raised if the needle is in central position, neither of the springs will be engaged by the needle, but if the needle is deflected, at the upper instant, varying with the amount of deflection, the needle will engage and force one or the other of springs 17 or 18 upward. Upward movement of the springs 17 and 18 causes the contacts 21 and 22 to engage adjustable contacts 23 and 24 carried in the conducting bus member 25. Formed integrally with or secured to the upper end of member 6 is an extension 26 with wings 27 and 28. A pair of hook members 29 and 30 carried by electro-magnetic switches 31 and 32 are so arranged that when the switches are actuated, and moved against the tension of springs 33 and 34, members 29 and 30 will be moved to the left in Fig. 1; engaging wings 27 and 28 and member 6 will be moved about its pivot 7 against the tension of spring 8 until the shoulder formed by 9 is disengaged from the upper rear edge of frame 10. This movement of member 6 permits frame 10 to drop until arrested by stop 14. The width of wings 27 and 28 is such that the vertical movement thereof will not be sufficient to effect the release thereof, and member 6 will be held to the left in Fig. 1 as long as either switch is actuated, but will be free to move vertically under the influence of cam 2. When both switches are released and return to the position shown in Fig. 1, under the influence of springs 33 and 34, spring 8 will move member 6 to the right in Fig. 1 and as it is raised cam surface 35 will force it to the left until the shoulder formed by projection 9 is free to slide over and re-engage the upper rear edge of frame 10, as shown in Fig. 1 at approximately the upper limit of the movement of member 6.

The switches 31 and 32 may be of any well known electromagnetically actuated trip release type, which when thrown into actuated position, will remain set until released by an electromagnetic release circuit. Since such switches are supplied by well known electrical companies and are well understood in the art, more detailed disclosure will not be made. The actuating circuits for the switches 31 and 32 are controlled by contacts 21 and 23, and 22 and 24 respectively, while the release circuits therefor are controlled by contacts 35' and 36. Contact 36 is carried on a spring 37 which is depressed to close the contacts by an actuating member 38 preferably of insulating material carried by member 3, when member 3 is in its lower position. The mechanism of the control instrument shown in Fig. 1 is the same as that of Fig. 2, Fig. 2 complementing Fig. 1 by showing more completely the electrical circuit.

Actuating coils 39 and 40 of switches 31 and 32 each have one terminal thereof connected by means of conductors 41 and 42 to contacts 21 and 22 respectively, and, as shown in Fig. 2, the other terminals thereof are connected to a common lead 43 through spring contact 44, insulated contact plate 45 of switch 31 in unactuated position, through conductor 46 to contact plate 47 of switch 32, to spring contact 48 in unactuated position of switch 32 to one side of a power supply line $L^1$. The other side of the power supply line $L^2$ is connected directly to contacts 23 and 24 through bar 25, so that when both switches are unactuated, closure of contacts 21 and 23 will complete a circuit through coil 39 and actuate switch 31, and closure of contacts 22 and 24 will energize coil 40 to actuate switch 32. The movement of either switch will be followed for an interval by springs 44 or 48 to maintain the energizing circuit long enough to set the switch, but before contacts 22 or 23 are moved to open their respective actuating circuits, these circuits will be interrupted at 44 and 48 respectively due to the movements of the switches 31 and 32, so that breaking of the circuits always occurs at relatively heavy switch contacts 44 and 45, and 47 and 48, it being understood that contacts 45 and 47 are movable with the switches and properly insulated. In this manner destructive arcing at contacts 22 and 24 is prevented and the life thereof is considerably prolonged.

When the switches 32 and 31 reach actuated position (as shown in Fig. 2 by the dotted lines for 31) they will engage contacts 48' and 49 respectively and be held in actuated position by means of magnetically controlled releasing trips (not shown). Contacts 48' and 49 are connected directly to $L^1$ and in actuated position of the switch 31, contact is made from contact 48' through insulated switch contact 50 through conductor 51 to trip release coil 52, through coil 52 to conductor 53 to release circuit control contact 35'. In actuated position of switch 32 contact is made from contact 49 through plate 54 thereof, through conductors 55 through coil 56 to conductor 53 and contact 35'. When contact 36 is closed by operation of member 37, an energizing circuit is completed from $L^2$ through conductor 57 to spring 37, contact 35', and through the release coil 52 or 56 of the actuated one of switches 31 or 32, thereby actuating the releasing trips to permit the restoration of the actuated switch to unactuated position. The conductors 58 and 59 branch from the conductors 51 and 55 respectively and may control remote motors, circuit breakers or the like.

The operation of the contacting galvanometer apparatus so far described is as follows. Shaft 1 and cam 2 maintain member 6 in continual vertical reciprocating motion. The parts are so proportioned that with the rear upper edge of frame 10 engaging the shoulder formed by projection 9, the weight of members 3 and 6 and the connected parts is such as to overbalance the weight of frame 10 and the galvanometer parts so that as 6 descends the front end of the frame and galvanometer needle 16 will rock upward, but when cam 2 causes member 6 to move upward, the front of the frame will drop until it engages stop 14. If the galvanometer needle is in central position as it is moved upward it will pass between the ends of springs 17 and 18 and no effect on the switches will be produced. If, however, the needle is deflected it will be engaged by edge 12 or 13 depending upon whether the deflection is left or right, and as the upward movement continues, the needle will engage one or the other of springs 17 or 18, and will close one or the other set of contacts 21 and 23, or 22 and 24, and this closure of contacts will energize coil 39 or 40 as the case may be, through the circuits above traced out, to actuate one or the other of switches 31 and 32, and thereby complete a control circuit through conductor 58 or conductor 59 as above set forth.

Actuation of either switch pulls member 6 to the left in Fig. 1 through operation of extension 29 or 30 on wings 27 or 28, so that the shoulder formed by 9 is disengaged from the upper rear edge of frame 10, and as soon as either switch is actuated, the frame is permitted to drop thereby freeing needle 16 to assume a new position. It will be noted that the movement of contacts 21 and 22 may be short owing to the fact that interruption of the circuit established by these contacts always occurs at contact 44 or 48 of the switches, and in this manner the needle is free to deflect for a major portion of the time of each cycle, and is gripped only during the time required to actuate the switch which is of very small duration. The weight of the parts is relatively so small, that no injury is occasioned to the needle in event of the parts sticking or the switches failing to function. The parts will simply remain suspended while the cam drops away from member 3 without injury thereto.

The setting or actuation of either switch 31 or 32, as above set forth, partially closes a trip circuit through its release coil 52 or 56, and when member 3 approaches the lower limit of movement the contacts 35' and 36 are closed and release the actuated switch so that it may return under the influence of its spring to unactuated position and close the circuits for coils 39 and 40 at contacts 44 and 48. The upward movement of member 6 after restoration of the actuated switch, by rotation of cam 2, will force member 6 to the left due to the engagement of surface 35 thereof with the rear of frame 10 until the upward limit of movement is approximately reached at which point the shoulder formed by projection 9 will slide over and re-engage the upper rear edge of frame 10, and the cycle of operation will be complete. Member 6 and the connected parts will again move downward causing the upward movement of the front of frame 10 in another cycle of operation.

Owing to the relative inclinations of edges 12 and 13, it will be clear that the point in the cycle at which the needle 16 will close the contacts 21 or 22 will vary with the amount of deflection of the needle, and the greater the deflection, the earlier in the cycle, the switches 31 and 32 will be actuated. Inasmuch as the release of the switches 31 and 32 always occurs at the same point in the cycle, it will be apparent that the time during which the switches are closed will be directly determined by the amount of deflection of the galvanometer. It will also be clear that although with the arrangement shown, the maximum time that the switches remain closed is the approximate time of one half a revolution of cam 2, this maximum time may be lengthened by causing cam 2 or another cam to close the contacts 35 and 36 at a later point in the cycle, but in sufficient time to release member 6 so that, the shoulder formed by 9 may re-engage the upper rear edge of frame 10 at the beginning of a cycle.

Having described a preferred form of controlling or contacting galvanometer arrangement, applications of this control to recording systems will be disclosed. In Fig. 2, the mechanism and circuits so far described, are shown with parts broken away on the upper half of the sheet. One terminal of the galvanometer 15 is connected through conductor 60 to a conducting ring 61 of a rotary switch, and the other terminal is connected by means of conductor 62 to conducting ring 63 of the rotary switch. The line conductor L² is connected directly to conducting ring 64 of the rotary switch. A plurality of thermocouples 65 located at different points, one only of which is shown, each have one terminal connected to one of the contacts 66 of the distributor or rotary switch by conductors 67, it being understood that each contact 66 is insulated from all of the other contacts and rings on the distributor face. The other terminal of each thermocouple is connected by means of conductors 68 to the traveling contactor 69 of a recorder individual thereto. This recorder is preferably of a type similar to the Westinghouse type M, graphic meter or like instrument, and in general may comprise a traveling member 70 upon which 69 is mounted, and which in turn travels upon a screw threaded shaft 71 which is driven through gears 72 and 73 from a reversing motor 74. Traveling member 70 carries a pen 75 which traces a record 76 on record sheet 77, as determined by the movement of the sheet and the movements of the pen. The slider 69 travels over a resistance slide wire 78 of a potentiometer arrangement which comprises the battery 79, the fixed resistance 80 and the adjustable or compensating resistance 81 all connected in series. The potentiometers are each connected to a separate and insulated contact 82 of the distributor by conductor 83. One terminal of each motor reversing circuit is connected by conductors 83' to a separate and insulated contact 84 of the distributor, and the other terminals of the motor reversing circuits are connected by conductors 86 and 87 at common points A and B, to the leads 58 and 59 from switches 31 and 32 respectively. Distributor brush arm 88, mounted on shaft 89 is provided with brushes 90, 91 and 92 insulated from the arm and from each other. Brush 90 connects contacts 66 to ring 61, brush 91 connects contacts 82 to ring 63, and brush 92 connects contacts 84 to ring 64. Shaft 89 is rotated in the usual manner at a uniform speed, or by special means hereinafter described, and connects each thermocouple and its individual recorder successively to the contacting common galvanometer and common switches 31 and 32.

As a potentiometer is utilized for each recorder, it becomes desirable to periodically adjust the potentiometers against a standard cell. This adjustment may be effected manually if desired, but is preferably effected automatically. For automatic adjustment, a pair of rotary distributor switches with contacts 94, and 95, and brushes 96 and 97 are provided. Brushes 96 and 97 are carried on shaft 89, or rotated otherwise in definite timed relation with respect to arm 88. The contacts 94 and 95 are connected to the ends of the potentiometer resistances 80 by conductors 98 and 99. Brush 96 is connected through a standard cell 100 to a common point C, and arm 97 is connected by conductor 102 to a common point D. Point C is connected by conductors 103 to a separate distributor contact 66' for each potentiometer to be adjusted. It will be understood that the set of contacts for the potentiometer adjustments and the set for the individual recorder circuits may be chosen in any two sectors of the distributor and are spaced apart for convenient illustration, but in practice it will be preferable to adjust the potentiometer just before the recorder individual thereto is connected to the common galvanometer and switches. Contact 84 of the potentiometer may be connected to the lead 83' of a separate reversible motor similar to motor 74 which separate motor drives shaft 105, pinion 106, gear 107 and screw shaft 108. Upon shaft 108 a traveling member 109 is carried to which is secured an adjusting slider 110 arranged to short circuit part of the resistance 81 through conductor 111. The leads 86 and 87 of this potentiometer current standardizing motor will be connected to points A and B respectively. If desired where only one recorder is provided, or a standard cell is utilized with each potentiometer the recorder motor 74 may be utilized to drive shaft 105, by providing a cam actuated clutch driven from shaft 89 to throw shafts 71 and 108 in and out of driving relation with respect to the motor 74 at the proper times, so that when the brushes 90, 91 and 92 are in the recorder sector, the motor will be driving only shaft 71 and when these brushes are in the potentiometer sector, only shaft 108 will be driven. In this event the lead 83 will be connected to contacts 84 in the recorder and potentiometer sector. By connecting lead 60 to 67, 62 to 83, and 83' to L², the distributor may be removed and the contacting galvanometer made individual to one recorder.

The operation of the contacting galvanometer to control switches 31 and 33 has already been described. Assuming brush arm 88 to be on the sector for the recorder shown in this position brushes 96 and 97 will be off contacts 94 and 95. If the position of slider 69 is such that the potential drop of the left hand section in Fig. 2 differs from the potential generated by the thermocouple, which potentials are always opposed, a current will flow through the couple, conductor 67, contact 66, brush 90, ring 61, conductor 60, galvanometer 15, conductor 62, ring 63, contact 82, conductor 83, left of slide wire 78, member 69, and conductor 68 to the couple. According to the direction of this current, needle 16 will deflect right or left, and will actuate switch 31 or 32, closing a circuit to the forward or reverse circuit of motor 74 through leads 58 or 59. This circuit will remain closed until contacts 35' and 36 are closed to open the actuated switch. While the switches 31 or 32 are closed, motor 74 will be rotated in the proper direction to restore the balance in the galvanometer circuit by adjusting the length of wire 78 in this circuit. As soon as the switch 31 or 32 is opened, the motor 74 stops. Shaft 89 is driven in properly timed relation with respect to cam shaft 1 so that one or more complete cycles of the contacting galvanometer occur during the interval that brushes 90, 91 and 92 remain in the sector. As member 70 shifts to balance the galvanometer coil, pen 75 is moved and traces a record of the change in conditions on sheet 77. The movement of arm 88 connects successive recorders in properly timed relation to the galvanometer circuit and switches controlled thereby.

At the proper time the arm 88 connects the potentiometer adjusting means in the circuit and at this time arms 96 and 97 will be on the proper contacts 94 and 95. In this position the potential drop across resistance 80 due to battery 79, and the potential due to the standard cell are opposed in the galvanometer circuit. If these potentials are unbalanced the galvanometer will be deflected and as at this time the other reversible motor 74 (not shown) driving shaft 105 is in the circuit closed by switch 31 or 32, slider 110 will be shifted in a direction to restore the balance of the galvanometer and will accordingly re-establish a standard condition in the potentiometer circuit.

To provide for establishing a complete balance in each circuit before the switches are shifted to the next set of contacts to connect in a new recorder or potentiometer set, a modification is shown in Fig. 3. Fastened to member 6 is a projecting spring contact member 112, and fastened to a fixed support is a co-acting spring contact member 113. Contacts 112 and 113 control a circuit through conductors 114 and 115, a source of electricity 116 and a stepping magnet 117. Magnet 117 actuates an armature 118 to which a stepping pawl 119 is pivoted. Pawl 119 is forced against ratchet wheel 120 by a spring 121. Wheel 120 is rigidly secured to and drives shaft 89 and a jockey roller 122 on a spring 123, or other suitable device is provided to properly position the distributor shaft at each step. Each actuation of magnet will advance the switch one step, from one contact sector to the next. Contacts 112 and 113 are so positioned that so long as the galvanometer is deflected and actuates either contact 21 or 22, they will not engage as the movement of member 6 to the left when switches 31 or 32 close pulls contact 112 clear of contact 113. As soon as the needle 16 reaches central position, however, neither switch 31 nor 32 will be actuated and in the downward movement of 6, contact 112 will engage contact 113 and actuate magnet 117 to advance the arm 88 to the next set of contacts. It will be apparent that each recorder or controlled circuit will be brought to a balance in this manner, before the galvanometer and switches 31 and 32 are connected to the next controlled circuit.

By suitable mechanisms the stepping of the ratchet wheeel 120 may be carried out in equivalent mechanical manner. Thus as shown in Fig. 6, for example, the lever 118 may have its fulcrum pivot 118' between its ends and be so located that it will be engaged by the part 112 and oscillated to advance the wheel 120 one step, when the member 6 is lowered while in engagement with the frame 10. In Fig. 6, the part 112 serves no electric contact purpose, but merely as a hook or shoulder for engaging and oscillating the lever 118. When the member 6 is tilted out of the position in which the shoulder 9 engages the frame 10, the part 112 of Fig. 6 can move down past the lever 118 without engaging the latter.

In Fig. 4, an arrangement for utilizing a balancing rheostat arrangement and a variable current recorder to replace the potentiometer recorders disclosed in Fig. 2 is provided. In this arrangement the leads 67 and 83 from contacts 66 and 82 are connected across a fixed resistance 124. A resistance 125 is substituted for slide wire 78 in Fig. 2 across which slider 69 carried by member 70 will move. Between resistances 124 and 125 a variable current recording meter 126 of any well known type is connected in series. A fixed resistance 127 is connected at one end to resistance 124 and at the other end is connected to resistances 125. Connected to the junction of resistances 124 and 127 is a resistance 128, which at its other end is connected to a resistance 129, in turn connected to the junction of resistance 125 and the recording meter. Connected from the junction of resistances 128 and 129 to the slider 69 by conductor 130 is a cell 131 which need not be standard, nor compensated against a standard cell as in the potentiometer arrangement. Leads 86 and 87 go to points A and B, and lead 83' goes to the proper distributor contact 84.

In operation a current normally flows through from the cell 131 through 130, slider 69, the left end of resistance 125, through recording meter 126, resistance 124, resistance 128 to the cell 131. The potential drop across resistance 124 will be balanced against the potential generated by the couple and when these potentials are unequal the galvanometer will be deflected and set the motor 74 in motion in the proper direction to re-establish the balance in the galvanometer circuit by shifting the slider to vary the current flowing through the recorder and resistance 124. In this manner, independently of potential variations in the cell 131, the current maintained through resistance 124 is always directly proportional to the potential generated by the thermocouple when a balance is effected in the galvanometer circuit, and the current flowing through the recorder 126 will produce an accurate record of the changes in the couple. The flow of current through the right section of resistance 125 and through 127 takes care of the superfluouos electrical energy, and it is only necessary that cell 131 be at all times large enough to maintain sufficient current flowing through resistance 124.

In the arrangement described for Fig. 4, a balancing rheostat arrangement and reversing motor is provided for each meter. It will, however, be apparent that by introducing suitable switching arrangements, a single balancing rheostat and reversing motor may be made common to the various recorder and thermocouple circuits.

One such suitable switching arrangement may be formed, for example, by making such changes in the circuit connections to the galvanometer controlled rotary switch or distributor of Fig. 2, that said switch will successively connect each of the different thermocouples in series with the galvanometer and resistance 124, and will connect each of the different meters to the balancing rheostat when the corresponding thermocouple is connected to the galvanometer and resistance 124.

One form of the switching arrangement last referred to is illustrated in Fig. 7, wherein 65A, 65B, 65C, and 65D, represent the thermocouples, and 126A, 126B, 126C and 126D the current meters which may pertain, respectively, to four different furnaces, the latter not being shown. In Fig. 7, the lower end of the rheostat resistance 124 is permanently connected to one terminal of each thermocouple by a conductor 680, and is permanently connected to one terminal of each meter by a conductor 126E. The other terminals of the different thermocouples 65A, 65B, 65C and 65D are connected to the corresponding switch contacts 66 by conductors 67A, 67B, 67C, and 67D, respectively. The second terminals of the different meters 126A, 126B, 126C, and 126D are connected to the corresponding switch contacts 82 by conductors 126a, 126b, 126c, and 126d, respectively. One terminal of the galvanometer coil is connected by conductor 60 to the switch contact 61, and the other galvanometer coil terminal is permanently connected by conductor 62 to the common point of rheostat resistances 124, 127, and 128. The switch contact 63 is permanently connected to the common point of the rheostat resistances 125 and 129 by a conductor 126e. The galvanometer control circuit conductors 58 and 59 are connected directly to the corresponding reversing terminals of the reversible rheostat motor 74, and the third terminal of the motor is directly connected by conductor 83' to the supply circuit conductor L². The galvanometer of Fig. 7 may be constructed, and may have its contacts and control circuits connected to the supply conductors L' and L², as illustrated in Figs. 1 and 2. In Fig. 7 the rotary switch contacts 64, 84 and 93 of Fig. 2 are not needed and are not shown.

In the position of the switch arm 88 shown in Fig. 7, the movable contact 90 connects the contact 61 to the particular contact 66 connected to the conductor 67A, and the movable contact 91 connects the contact 63 to the particular contact 82 to which the conductor 126a is connected. In such position of the switch arm, the thermocouple 65A is operatively connected to the galvanometer and balancing rheostat and the current meter 126A is operatively connected to the rheostat, and the remaining thermocouples and rheostats are open circuited. When the shaft 89 and switch arm 88 are angularly advanced counter-clockwise one-quarter of a turn, thermocouple 65A and meter 126A are open circuited, and thermocouple 65B and meter 126B are operatively connected to the galvanometer and rheostat. The two following quarter turns of the switch arm 88 bring into operative relation with the galvanometer and rheostat, first the thermocouple 65C and meter 126C, and then the thermocouple 65D, meter 126D. The next quarter turn of the arm 88 will restore the conditions shown in Fig. 7.

The releasing coils 52 and 56 of switches 31 and 32, together with contacts 35 and 36 may be eliminated and a mechanical catch arrangement substituted therefor, as shown in Fig. 5. In this event a cam projection 132 is secured to the member 6 and is arranged to engage a cam projection 133 carried by a flat spring 134. The springs 33 and 34 of switches 31 and 32 are eliminated in this form. When either of these switches is actuated member 6 will be forced to the left, forcing member 133 and spring 134 upward until member 134 can snap over 133 and lock member 6 to the left. As the member 6 approaches the limit of its downward movement, member 132 will drop below 133, and spring 8 will then move 6 to the right, in this manner opening the actuated switch. The switches may also be actuated mechanically instead of electrically by interposing mechanical controlling elements between constantly reciprocating cam actuated members through the functioning of the needle 16, frame 10, and mechanical members to replace contacts 21 and 22.

My divisional application, Serial No. 94,143, filed August 4, 1936, contains claims on subject matter disclosed but not claimed herein.

Having described preferred embodiments of the invention of which many modifications may be made within the spirit thereof by those skilled in the art, what is desired to be secured by Letters Patent and claimed as new is:—

1. The combination with a plurality of elements creating separate measurable effects, of a corresponding plurality of positionable means, each adapted, when connected to the corresponding element and a control device adapted to respond to the measurable effect of said element, to assume a position selectively dependent upon said effect, a common controlling device adapted to respond to each of said effects, and means for connecting said device successively to the different elements and positionable means so that said device may actuate each of said positionable means, when connected thereto, in a direction and to an extent selectively dependent on the difference between the value of the measurable effect of the corresponding element at that time and its value at the time of the preceding connection of said element and device.

2. The combination with a plurality of elements creating separate measurable effects, of a corresponding plurality of recorders, each including an adjustable recording member adapted to be adjusted into different positions selectively dependent on the measurable effect of the corresponding element, when the recorder and corresponding element are connected with a recorder controlling device adapted to respond to the effect of said element, a common recording controller device adapted to respond to each of said effects, and means for connecting said device successively to the different elements and recorders so that said device may actuate the said recorder member of each recorder, when connected thereto, in accordance with the difference between the effect of the corresponding element at the time, and the effect of said element at the time of its preceding connection to said device.

3. The combination with a plurality of sources of electromotive force of a corresponding plurality of measuring devices, each including an adjustable measuring element adapted to be adjusted into different positions selectively dependent on the electromotive force of the corresponding source, when the device and said corresponding source are connected to a galvanometer, a galvanometer, and means for connecting said galvanometer successively to the different sources and devices so that said galvanometer may adjust the said measuring element of each device when connected thereto in accordance with the electromotive force of the corresponding source.

4. The combination with a plurality of self-balancing potentiometers, of a common control galvanometer, and means for connecting the latter successively to the different potentiometers so that it may control the balancing of each potentiometer when connected thereto.

5. The combination with a plurality of galvanometer energizing sources and a corresponding plurality of meters, of a galvanometer, a self-balancing rheostat controlled by said galvanometer, and means for successively connecting said galvanometer to said sources and said rheostat to said meters so that each meter, when connected to said rheostat, will measure a current producing effect of the corresponding source then connected to the galvanometer.

6. In an automatic control system, a galvanometer, a plurality of switches, means through which said galvanometer is adapted to control said switches in selective accordance with the deflections of said galvanometer, a plurality of reversing motors, a switch mechanism connecting said reversing motors in succession to said switches, and means for shifting said switch mechanism to succeeding motor circuits only when said galvanometer is undeflected.

7. The combination as set forth in claim 6 together with means for shifting said switch mechanism to succeeding motor circuits at irregular intervals, the length of the time period between successive intervals being dependent on the character of the galvanometer deflection occurring during such period.

8. In combination, a galvanometer, a plurality of thermocouples, means for successively connecting said thermocouples in said galvanometer circuit, a balancing resistance in said galvanometer circuit, means controlled by said galvanometer for varying the current flowing through said resistance to balance said galvanometer circuit, a plurality of variable current meters, and means for successively connecting said meters to said galvanometer, whereby each meter measures current flow through said resistance when the corresponding thermocouple is connected to said galvanometer.

9. In combination a galvanometer, a plurality of measuring instruments each comprising a variable resistance and means adapted for control by the galvanometer to vary the portion of said resistance in the circuit of such galvanometer, when the latter is connected to said instrument, and a distributor switch mechanism controlled by the galvanometer for successively connecting the galvanometer to the different instruments.

10. In combination a galvanometer, a plurality of measuring instruments each comprising a variable resistance and means adapted for control by the galvanometer to vary the portion of said resistance in the circuit of such galvanometer, when the latter is connected to said instrument, a distributor switch mechanism for successively connecting the galvanometer to the different instruments and operating means for said mechanism controlled by the galvanometer for actuation at irregular intervals, the length of the period between successive intervals being dependent on the character of the galvanometer deflection occurring during such period.

11. The combination with a plurality of galvanometer energizing sources and a corresponding plurality of galvanometer controlled devices, of a galvanometer, a distributor switch mechanism for successively connecting said sources and said devices to said galvanometer so that each device when connected to said galvanometer is controlled by the latter in accordance with a current producing effect of the corresponding sources, and means controlled by said galvanometer for actuating said mechanism at irregular intervals, the length of the period between successive intervals being dependent on the character of the galvanometer deflection occurring during said period.

12. In combination, sources of measurable effects, a selective device successively responsive to said effects, a plurality of meter mechanisms, each including a variable resistance, and a plurality of reversing motors operative under control of said selective device to successively vary said resistances.

13. The combination with a plurality of elements creating separate measurable effects, of a corresponding plurality of measuring mechanisms each comprising automatic adjusting provisions including a normally deenergized electric motor and an adjustable measuring element adapted to be adjusted by said provisions, a common controlling device, means for connecting said elements one at a time and in succession to said device and at the time of connecting the latter to any one element for simultaneously connecting the latter to a corresponding one of said mechanisms, and means through which said controlling device, when so connected to any one element, energizes the said motor of the corresponding mechanism selectively so as to adjust said mechanism in accordance with the difference between the effect of the element last referred to at that time and its value at the time of its preceding connection with said device.

14. The combination with a plurality of measuring instruments having potentiometer measuring means including a resistance, means for the connection of a variable portion of said resistance into a measuring circuit and a relay mechanism for adjusting said means to vary the magnitude of the said resistance portion, a common controlling device adapted to respond to unbalance in a measuring circuit, and means adjustable to establish a plurality of measuring circuits, one for each of said instruments and each including the said resistance portion of the corresponding instrument, said device and a source of electromotive force to be measured, and means for establishing a control connection between said device, when so connected in a measuring circuit, and the relay mechanism of the corresponding instrument for the adjustment of the first mentioned means of the latter in accordance with the response of said device to unbalance in the last mentioned circuit.

15. The combination with a plurality of measuring instruments each having potentiometer measuring means including a resistance, means including a contact in movable engagement with said resistance for the connection of a variable portion of the latter into a measuring circuit, and a relay mechanism including a reversible electric motor for adjusting said contact including means to vary the magnitude of the said resistance portion, a common control means including a galvanometer adapted to respond to unbalance in a measuring circuit, means adjustable to establish a plurality of measuring circuits, one for each of said instruments, each of said measuring circuits including the said resistance portion of the corresponding instrument, the said galvanometer and a source of electro-motive force to be measured, and means for establishing a control connection, when said galvanometer is so connected in a measuring circuit, between said controlling means and the said motor of the corresponding instrument for the adjustment of the contact including means of said corresponding instrument, in accordance with the response of said galvanometer to unbalance in the last mentioned circuit.

16. The combination of a galvanometer with a plurality of galvanometer energizing sources and a corresponding plurality of indicating means each including a self-balancing variable resistance means controllable by said galvanometer and means for successively connecting said galvanometer to said sources and indicating means, whereby each indicating means is actuated in accordance with the corresponding source.

17. The combination of a galvanometer with a plurality of galvanometer energizing sources and a corresponding plurality of indicating means each including a self-balancing potentiometer controllable by said galvanometer and means for successively connecting said galvanometer to said sources and indicating means, whereby each indicating means is actuated in accordance with the corresponding source.

THOMAS R. HARRISON.